(12) United States Patent
Shima

(10) Patent No.: US 7,076,506 B2
(45) Date of Patent: Jul. 11, 2006

(54) APPARATUS FOR MANAGING ELECTRONIC DATA, PROGRAM CODE AND THE RECORDING MEDIUM THEREOF, AND SYSTEM FOR MANAGING ELECTRONIC DATA

(75) Inventor: Masakazu Shima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 505 days.

(21) Appl. No.: 10/315,105

(22) Filed: Dec. 10, 2002

(65) Prior Publication Data
US 2003/0212952 A1  Nov. 13, 2003

(30) Foreign Application Priority Data
Dec. 14, 2001 (JP) ............................... 2001-382240
Nov. 25, 2002 (JP) ............................... 2002-341223

(51) Int. Cl.
*G06F 17/30* (2006.01)
(52) U.S. Cl. .................................................. 707/104.1
(58) Field of Classification Search ............... 707/102, 707/104.1
See application file for complete search history.

(56) References Cited

U.S. PATENT DOCUMENTS

| | | | | |
|---|---|---|---|---|
| 5,341,469 | A | * | 8/1994 | Rossberg et al. ............ 715/514 |
| 6,347,323 | B1 | * | 2/2002 | Garber et al. ................ 707/203 |
| 6,462,756 | B1 | * | 10/2002 | Hansen et al. ............... 715/764 |
| 6,643,652 | B1 | * | 11/2003 | Helgeson et al. ............. 707/10 |
| 6,681,372 | B1 | * | 1/2004 | Yajima ......................... 715/541 |
| 2002/0016800 | A1 | * | 2/2002 | Spivak et al. ................ 707/523 |
| 2002/0019827 | A1 | * | 2/2002 | Shiman et al. .............. 707/200 |
| 2002/0049603 | A1 | * | 4/2002 | Mehra et al. ................... 705/1 |
| 2002/0169788 | A1 | * | 11/2002 | Lee et al. ................. 707/104.1 |

FOREIGN PATENT DOCUMENTS

JP 5-324438 12/1993

* cited by examiner

*Primary Examiner*—Wayne Amsbury
(74) *Attorney, Agent, or Firm*—Dickstein Shapiro Morin & Oshinsky LLP

(57) ABSTRACT

In an electronic data managing system, predetermined attribute values of attribute values of the electronic data are assigned to attribute items different from attribute items to which the attribute values have been assigned at a copy-to apparatus. Then, the predetermined attribute values assigned to the different attribute items by the assigning part are transmitted to a copy-to apparatus.

19 Claims, 16 Drawing Sheets

DOCUMENT

DOCUMENT NAME: ORDER REQUEST

DOCUMENT NUMBER: 0001

REGISTRATION DATE: MARCH 31, 2001

COMPANY NAME: RRR

SECURITY LEVEL: CONFIDENTIAL

ATTRIBUTE

| DOCUMENT ID | POINTER TO CONTENTS IN STORAGE AREA | DOCUMENT ATTRIBUTE ID SEQUENCE |
|---|---|---|
| 0001 | Addr1 | 0001, 0002, 0003, 0004, 0005 |
| 0002 | Addr2 | 0001, 0002, 0003, 0004, 0006 |

| DOCUMENT ATTRIBUTE ID | ATTRIBUTE NAME |
|---|---|
| 0001 | DOCUMENT NAME |
| 0002 | DOCUMENT NUMBER |
| 0003 | REGISTRATION DATE |
| 0004 | COMPANY NAME |
| 0005 | ORIGINATOR |
| 0006 | SECURITY LEVEL |

112

| DOCUMENT ATTRIBUTE ID | ATTRIBUTE NAME |
|---|---|
| 0001 | DOCUMENT NAME |
| 0002 | DOCUMENT NUMBER |
| 0003 | REGISTRATION DATE |
| 0004 | COMPANY NAME |
| 0005 | ORIGINATOR |
| 0007 | RECEIPT DATE |

FIG.7

| DOCUMENT ID | DOCUMENT ATTRIBUTE ID | ATTRIBUTE VALUE |
|---|---|---|
| 0001 | 0001 | PROJECT A PLAN |
| 0001 | 0002 | 0123 |
| 0001 | 0003 | AUGUST 15, 2000 |
| 0001 | 0004 | RRR |
| 0001 | 0005 | **** |
| 0002 | 0001 | PRODUCT A ORDER REQUEST |
| 0002 | 0002 | 0001 |
| 0002 | 0003 | MARCH 31, 2001 |
| 0002 | 0004 | RRR |
| 0002 | 0006 | CONFIDENTIAL |

| COPY-FROM DOCUMENT ATTRIBUTE ID | PREFIX | COPY-TO DOCUMENT ATTRIBUTE ID |
|---|---|---|
| 0001 | <null> | <null> |
| 0002 | ORDER- | 0002 |
| 0003 | <null> | 0007 |
| 0004 | <null> | 0004 |
| 0005 | <null> | 0005 |
| 0006 | <null> | <null> |

| DOCUMENT ID | POINTER TO CONTENTS IN STORAGE AREA | DOCUMENT ATTRIBUTE ID SEQUENCE |
|---|---|---|
| 0002 | Addr2 | 0001, 0002, 0003, 0004, 0006 |

213

| DOCUMENT ID | DOCUMENT ATTRIBUTE ID | ATTRIBUTE VALUE |
|---|---|---|
| 0002 | 0001 | PRODUCT A ORDER REQUEST |
| 0002 | 0002 | 0001 |
| 0002 | 0003 | MARCH 31, 2001 |
| 0002 | 0004 | RRR |
| 0002 | 0006 | CONFIDENTIAL |

FIG.12

| DOCUMENT ID | POINTER TO CONTENTS IN STORAGE AREA | DOCUMENT ATTRIBUTE ID SEQUENCE |
|---|---|---|
| 0002 | Addr2 | 0002, 0007, 0004 |

⌐ 111

| DOCUMENT ID | DOCUMENT ATTRIBUTE ID | ATTRIBUTE VALUE |
|---|---|---|
| 0002 | 0002 | ORDER-0001 |
| 0002 | 0007 | MARCH 31, 2001 |
| 0002 | 0004 | RRR |

⌐ 113

APPARATUS FOR MANAGING ELECTRONIC DATA, PROGRAM CODE AND THE RECORDING MEDIUM THEREOF, AND SYSTEM FOR MANAGING ELECTRONIC DATA

BACKGROUND OF THE INVENTION

1. Field of the Invention

The present invention generally relates to apparatuses for managing electronic data, methods for managing electronic data, program code and recording media thereof, and systems for managing electronic data, and more particularly to an apparatus for managing electronic data, program code and the recording medium thereof, and a system for managing electronic data, in which in a case in that attribute values of a document are differently defined among servers where the document is registered, even if the document is copied from one server to another server, those attribute values can be assigned to optimal respective attribute items.

2. Description of the Related Art

There is a conventional electronic document managing system having a function to periodically copy a document registered in a server to another server (replication). By utilizing this function, a copied document is further updated a certain period later after an original document is changed.

In the conventional document managing system, the same document can exist in a plurality of servers. Advantageously, when one document is referred to, the workload is distributed to a plurality of servers. Moreover, the document registered in a server located far away can be referred to at a nearby server in a network.

Moreover, in the conventional electronic document managing system, Japanese Laid-Open Patent Application No. 05-324438 discloses an electronic document managing system having a function in that a document can be registered by relating to attributes such as a document name, a registration date, and the like as shown in FIG. 1.

As shown in FIG. 2, when a document having attributes is copied, the attributes are copied without any change in the conventional electronic document managing system and are referred to by the same attributes at a server where the document is copied (hereinafter called a copy-to apparatus). That is, 1. Add "ORDER-" at the beginning of a value assigned to an attribute item "document number" at a server where the document is stored before being copied (hereinafter called a copy-from apparatus) [change the attribute value], 2. Assign a value assigned to an attribute item "registration date" at the copy-from apparatus to an attribute item "receipt date" [change the attribute item], and 3. Do not set values, which assigned attribute items "document name" and "security level" at the copy-from apparatus, at the copy-to apparatus [delete the attribute item], the above operations are not conducted to meet requirements of the attributes at the copy-to apparatus in the conventional electronic document managing system.

SUMMARY OF THE INVENTION

It is a general object of the present invention to provide apparatuses for managing electronic data in which the above-mentioned problems are eliminated.

A more specific object of the present invention is to provide an apparatus for managing electronic data in which when attributes of electronic data are copied from a copy-from apparatus to a copy-to apparatus, the attributes of the electronic data can be registered in a form suitable for requirements at the copy-to apparatus.

The above objects of the present invention are achieved by an apparatus for managing electronic data as a copy-to apparatus receiving the electronic data to copy, including: an electronic data managing part managing electronic data; an assigning part assigning predetermined attribute values of attribute values of the electronic data received from a copy-from apparatus to different attribute items from attribute items to which the attribute values have been assigned at the copy-to apparatus, the copy-from apparatus managing and copying the electronic data to the copy-to apparatus; and a registering part registering the predetermined attribute values assigned to the different attribute items by the assigning part to the electronic data managing part.

In the apparatus as the copy-to apparatus, the attribute items of the electronic data of the copy-from apparatus are automatically assigned to different attribute items. Therefore, it is possible to register or display the attributes of the electronic data in a form suitable for requirements of the copy-to apparatus.

Moreover, the apparatus may include a value converting part converting the predetermined attribute values of the attribute values received from the copy-from apparatus to different attribute values from the predetermined attribute values, wherein the register part registers the different attribute values to the electronic data managing part.

In the apparatus, the attribute values of the electronic data of the copy-from apparatus are automatically converted. Therefore, it is possible to register or display the attribute values of the electronic data in the form suitable for the requirements of the copy-to apparatus.

Furthermore, the apparatus may include a registration suppressing part suppressing the registering part from registering the predetermined attribute values of the attribute values received from the copy-from apparatus.

In the apparatus, it is possible to suppress registering the attributes because some of the attributes of the electronic data of the copy-from apparatus are not suitable for the copy-to apparatus.

Also, the above objects of the present invention are achieved by an apparatus for managing electronic data as a copy-from apparatus sending the electronic data to copy, including: an assigning part assigning predetermined attribute values of attribute values of the electronic data, which are to be transmitted to a copy-to apparatus, to different attribute items from attribute items to which the attribute values have been assigned at the copy-from apparatus, the copy-to apparatus managing the electronic data copied from the copy-from apparatus; and a transmitting part transmitting the predetermined attribute values assigned to the different attribute items by the assigning part to the copy-to apparatus.

In the apparatus as the copy-from apparatus, the attribute items of the electronic data of the copy-from apparatus are automatically assigned to different attribute items and are transmitted to the copy-to apparatus. Therefore, it is possible to register or display the attributes of the electronic data of the copy-from apparatus in a form suitable for requirements of the copy-to apparatus.

Moreover, the apparatus may include a value converting part converting the predetermined attribute values of the attribute values, which are to be transmitted to the copy-to apparatus to different attribute values from the predetermined attribute values, wherein the transmitting part transmits the different attribute values to the copy-to apparatus.

In the apparatus, the attribute values of the electronic data of the copy-from apparatus are automatically converted to different attribute values and are transmitted to the copy-to apparatus. Therefore, it is possible for the copy-to apparatus to register or display the attribute values of the electronic data in the form suitable for the requirements of the copy-to apparatus.

Furthermore, the apparatus may include a transmission suppressing part suppressing the transmitting part from transmitting the predetermined attribute values of the attribute values to the copy-to apparatus.

In the apparatus, the predetermined attribute values of the attribute values of the electronic data of the copy-from apparatus are transmitted. Therefore, it is possible for the copy-to apparatus to suppress registering the attributes because some of the attributes of the electronic data of the copy-from apparatus are not suitable for the copy-to apparatus.

The above objects of the present invention can be achieved by a method for managing electronic data in a copy-from apparatus transmitting the electronic data to copy, program code for causing a computer to manage electronic data in a copy-from apparatus transmitting the electronic data to copy, or a computer-readable recording medium recorded with the program code for causing a computer to manage electronic data in a copy-from apparatus transmitting the electronic data to copy.

BRIEF DESCRIPTION OF THE DRAWINGS

Other objects, features, and advantages of the present invention will become more apparent from the following detailed description when read in conjunction with the accompanying drawings, in which:

FIG. 5 is a diagram showing a data structure of a document table according to the embodiment of the present invention;

FIG. 6 is a diagram showing a data structure of a document attribute table according to the embodiment of the present invention;

FIG. 7 is a diagram showing a data structure of a document attribute value table according to the embodiment of the present invention;

FIG. 8 is a diagram showing a data structure of the attribute converting table according to the embodiment of the present invention;

FIG. 11 is a diagram illustrating document data transmitted to a copy-to apparatus;

FIG. 12 is a diagram illustrating copied document data;

DESCRIPTION OF THE PREFERRED EMBODIMENTS

Figure 1:
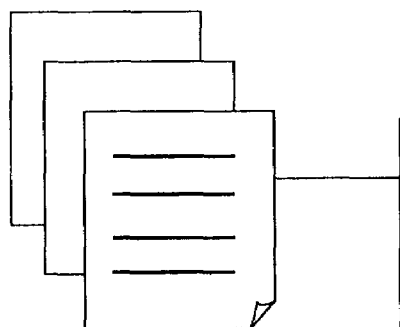
FIG. 1 is a diagram showing a relationship between a document and attributes of the document in a conventional electronic document managing system.
Figure 2:
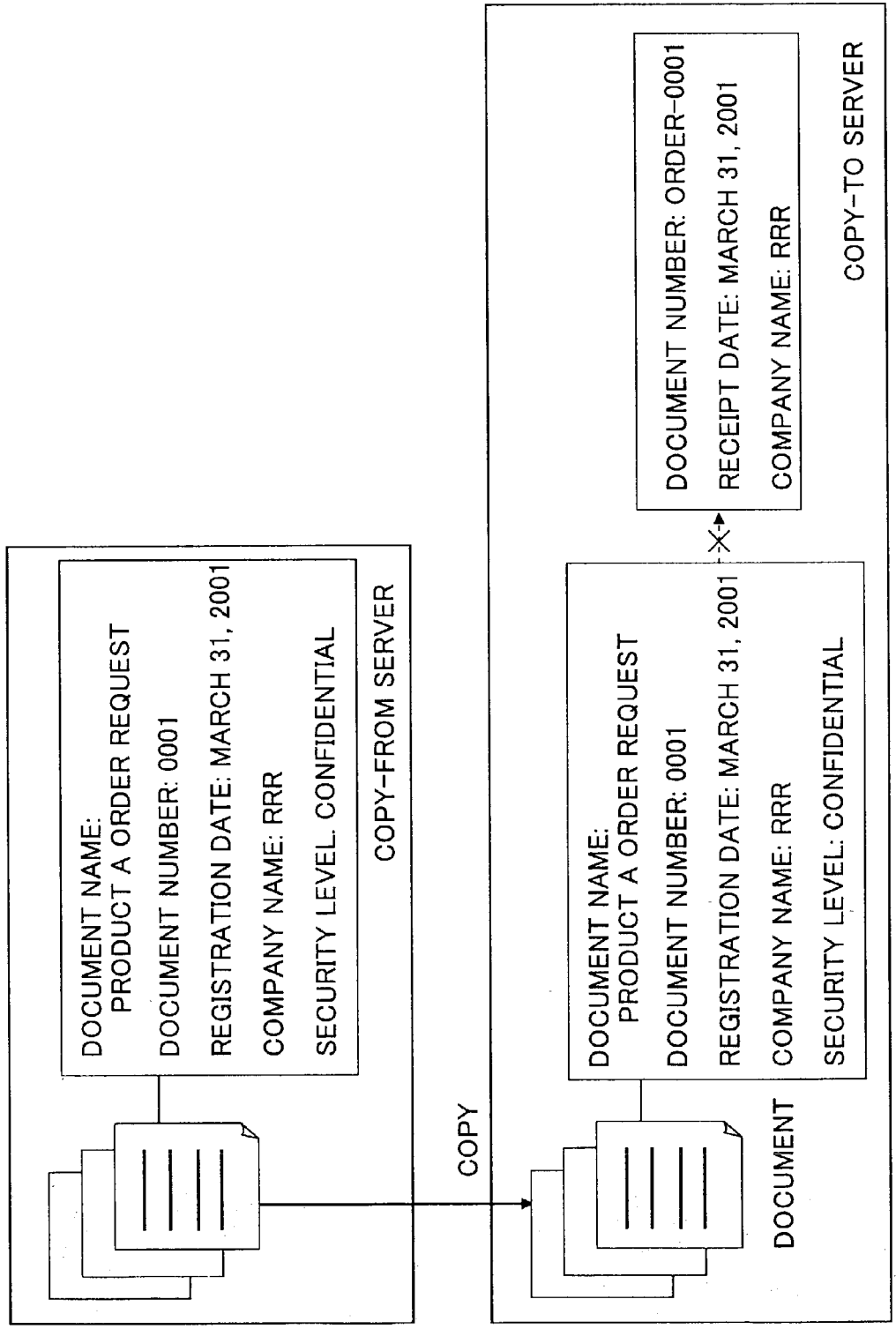
FIG. 2 is a diagram illustrating a document copy process conducted by the conventional electronic document managing system.
Figure 3:
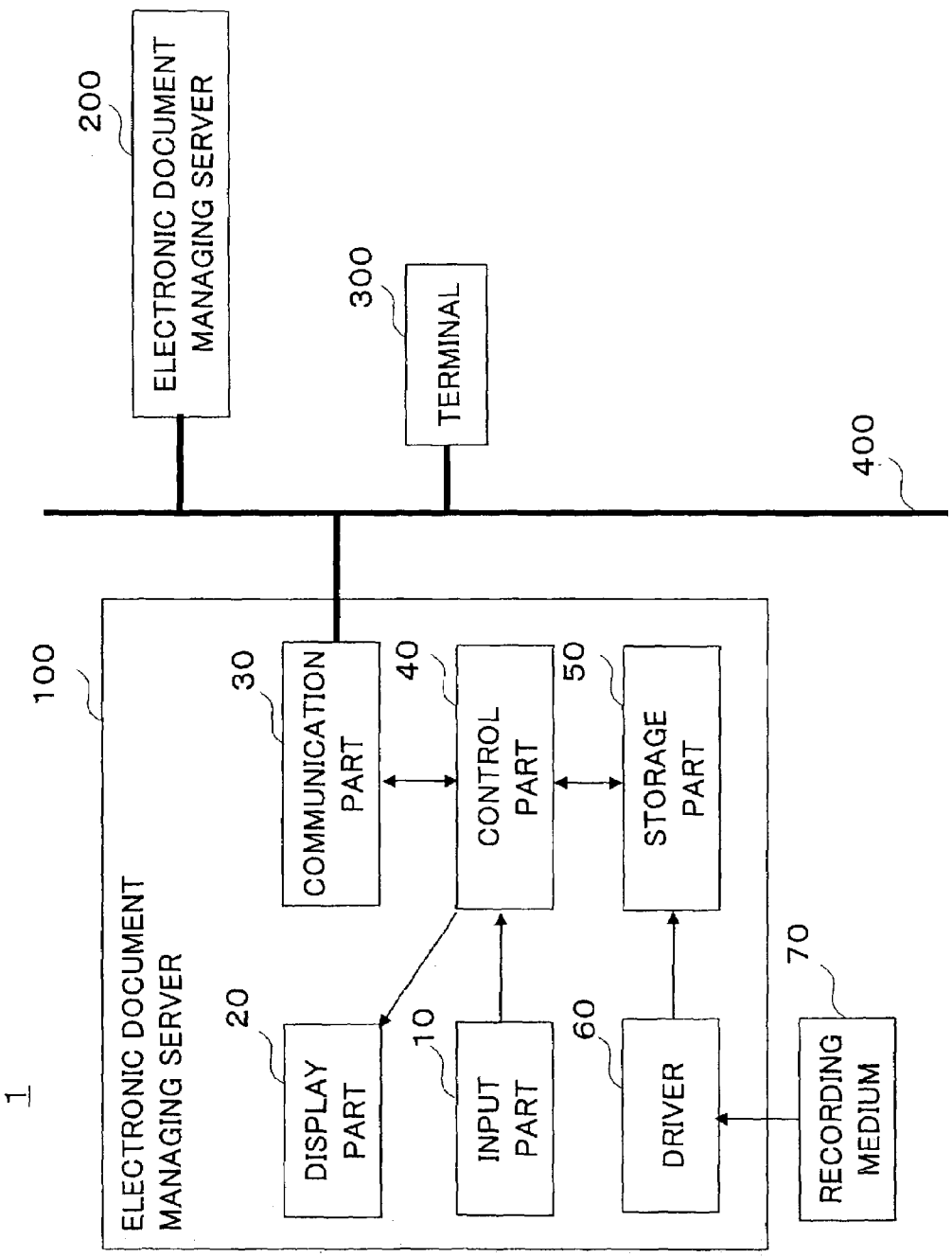
FIG. 3 is a block diagram showing a configuration of an electronic document managing system according to an embodiment of the present invention.

In the following, embodiments of the present invention will be described with reference to the accompanying drawings. FIG. 3 is a block diagram showing a configuration of an electronic document managing system according to an embodiment of the present invention. In an electronic document managing system 1, an electronic document managing server 100, an electronic document managing server 200, a terminal 300, and a like are connected through a network 400 such as a LAN (Local Area Network). The electronic document managing servers 100 and 200 are computers including databases managing documents, respectively. The terminal 300 is a computer such as a personal computer, and can operate the electronic document managing servers 100 and 200 through the network 400.

In a hardware configuration, the electronic document managing server 100 as shown in FIG. 3 includes an input part 10, a display part 20, a communication part 30, a control part 40, a storage part 50, a driver 60, and a like. The input part 10 is a part for receiving a request for registering or updating a document. The display part 20 is a part for displaying a document and attributes of the document. The storage part 50 is a part for storing the document and the attributes of the document. The control part 40 is a part for registering the document input from the input part 10, reading the document to be copied to another server from the storage part 50 and sending the document to the communication part 30, and registering the document to be copied to the storage part 50. The communication part 30 is a part for sending or receiving the document to be copied between servers through the network 400. The driver 60 is a device for reading information recorded on a recording medium 70 such as a CD-ROM (Compact Disc Read-Only Memory) or a like.

The document copy program used by the electronic document managing server 100 is provided by the recording medium 70. The recording medium 70 recording the document copy program is inserted in the driver 60, and is installed into the storage part 50 through the driver 60 from the recording medium 70.

The present invention can be applied to any system or any server if the server or the system includes the hardware configuration above-described. It should be noted that the electronic document managing server 200 also includes the same hardware configuration as the electronic document managing server 100. However, in a case in which the electronic document managing server 100 and the electronic document managing server 200 are remotely controlled by the terminal 300 or the like, the input part 10 and the display part 20 are not always required for the electronic document managing server 100 and the electronic document managing server 200.

Figure 4:
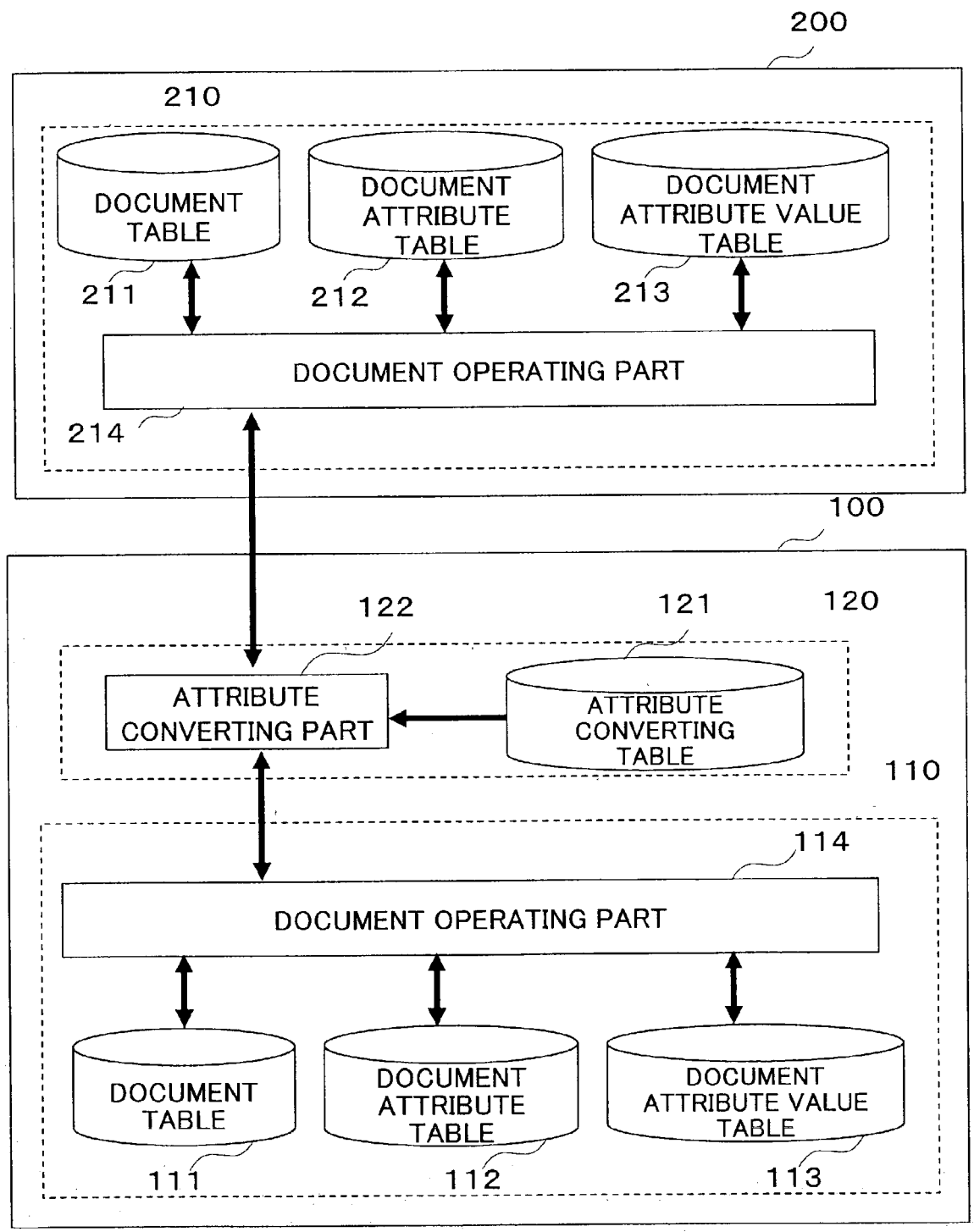
FIG. 4 is a block diagram showing functional configurations of electronic document managing servers according to the embodiment of the present invention.

Functional configurations of the electronic document managing servers 100 and 200 will be described. FIG. 4 is a block diagram showing the functional configurations of electronic document managing servers according to the embodiment of the present invention. The electronic document managing server 100 in FIG. 4 includes a document managing part 110 and a document copying part 120.

The document managing part 110 is to provide a database function for managing documents and attributes of the documents, and includes a document table 111, a document attribute table 112, a document attribute value table 113, and a document operating part 114. The document table 111, the document attribute table 112, and the document attribute value table 113 (hereinafter, generally called the document tables 111 through 113 for these three tables) are tables for managing the documents and the attributes of the documents (described later in detail). The document operating part 114 is to provide an interface for the document tables 111 through 113 in respect to upper applications utilizing the document managing part 110. For example, the document operating part 114 provides a function for searching for the document and the attributes of the document from the document table 111 through 113 and the like, a function for registering the document and the attributes of the documents to the document tables 111 through 113.

It should be noted that the document tables 111 through 113 are not always required to be tables such as an RDB (Relational DataBase), and are not limited to a specific table form but can store information. For example, the document tables 111 through 113 can be implemented by CSV (Comma Separated Value) files or XML (extensible Markup Language) files. In this case, the document operating part 114 corresponds to an API (Application Program Interface) to operate the CSV files or the XML files.

The document copying part 120 can be realized by the control part 40 executing a document copying program according to the present invention. The document copying part 120 has a function for copying the document and the attributes of the document between the electronic document managing server 100 and the electronic document managing server 200, and includes an attribute converting table 121, and an attribute converting part 122. The attribute converting table 121 is a table to manage a conversion rule of copying the attributes of the document that will be described later. That is, the document copying part 120 can conduct a predetermined conversion to the attributes then copy the attributes from the electronic document managing server 100 to the electronic documents managing server 200 or vice versa. And the attribute converting table 121 manages the conversion rule.

The attribute converting part 122 copies the document and the attributes of the documents from the electronic document managing server 100 to the electronic documents managing server 200 or vice versa, in accordance with the conversion rule stored in the attribute converting table 121.

It should be noted that the attribute converting table 121 can also be implemented by the CSV files or the XML files, similar to the document table 111.

The electronic document server 200 includes a document managing part 210. The document managing part 210 includes similar configurations and functions of the document managing part 110 of the electronic document managing server 100. That is, the document managing part 210 includes a document table 211, a document attribute table 212, a document attribute value table 213, and the document operating part 214. The document table 211 corresponds to the document table 111, and the document attribute table 212 corresponds to the document attribute table 112. Moreover, the document attribute value table 213 corresponds to the document attribute value table 113, and the document operating part 214 corresponds to the document operating part 114. However, the documents and the attributes of the documents, which are managed in the document table 211, the document attribute table 212, the document attribute value table 213, and the like (hereinafter, generally called the document tables 211 to 213 for these three tables), are not always the same as the documents and the attributes of the documents managed in the document tables 111 through 113.

Next, each of tables above-described will be further described in detail. FIG. 5 is a diagram showing a data structure of the document table according to the present invention. In FIG. 5, the document table 211 of the electronic document managing server 200 is illustrated. The document table 211 maintains an ID uniquely identifying a document (hereinafter, called "DOCUMENT ID", attribute items possessed by the document, and a like.

In FIG. 5, "POINTER TO CONTENTS IN STORAGE AREA" is a pointer to a recording area where the actual data of the document are stored. The control part 40 can obtain the actual data of the document by utilizing the pointer. "DOCUMENT ATTRIBUTE ID SEQUENCE" is written as a sequence of ID values (hereinafter, called document attribute ID) assigned to uniquely identify the attribute of the document in the electronic document managing system 1.

Referring to FIG. 5, a document specified by the document ID "0001" includes the attribute items identified by document attribute IDs "0001", "0002", "0003", "0004", and "0005", and actual data of the document are stored at a location indicated by "Addr1". On the other hand, a document specified by the document ID "0002" includes the attribute items indicated by document attribute IDs "0001", "0002", "0003", "0004", and "0006", and the actual data of the document are stored at a location indicated by "Addr2". It should be noted that the document table 111 of the electronic document managing server 100 has the same data structure as the document table 211.

FIG. 6 is a diagram showing a data structure of the document attribute table according to the present invention. Each of the document attribute tables 212 and 112 includes data items including the document attribute ID, an attribute name identified by the document attribute ID, and available document attribute IDs and available attribute names are maintained as records in each of the electronic document managing servers 200 and 100, respectively.

Referring to FIG. 6, the document attribute table 212 maintains (0001, DOCUMENT NAME), (0002, DOCUMENT NUMBER), (0003, REGISTRATION DATE), (0004, COMPANY NAME), (0005, ORIGINATOR), and (0006, SECURITY LEVEL) as the document attribute ID and the attribute name. The document attribute table 111 maintains (0001, DOCUMENT NAME), (0002, DOCUMENT NUMBER), (0003, REGISTRATION DATE), (0004, COMPANY NAME), (0005, ORIGINATOR), and (0007, RECEIPT DATE) as the document attribute IDs and the attribute names.

FIG. 7 is a diagram showing a data structure of the document attribute value table according to the present invention. Referring to FIG. 7, the document attribute value table 213 of the electronic document managing server 200 is illustrated. The document attribute value table 213 is a table to store attribute values possessed by each document, and includes data items including document ID, document attribute ID, an attribute value, and a like. The document ID corresponds to the document ID of the document table 211. The document attribute ID corresponds to the document attribute ID of the document attribute table 212. The attribute value stores a value of each document attribute.

Referring to FIG. 7, the document specified by the document ID "0001" includes the attributes items identified by the document attribute IDs "0001", "0002", "0003", "0004", and "0005", and their attribute values are "PROJECT A PLAN", "0123", "Aug. 15, 2000", "RRR", and "****". The document specified by the document ID "0002" includes the attribute items identified by the document attribute Ids "0001", "0002", "0003", "0004", and "0006", and their attribute values are "PRODUCT A ORDER REQUEST", "0001", "Mar. 31, 2001", "RRR", and "CONFIDENTIAL". It should be noted that the document attribute value table 113 of the electronic document managing server 100 has the same data structure as the document attribute value table 213.

FIG. 8 is a diagram showing a data structure of the attribute converting table according to the present invention. The attribute converting table 121 is a table describing how the attributes of the document are converted when the document and the attributes of the document are copied, and includes data items including a copy-from document attribute ID, a prefix, a copy-to document attribute ID, and a like. The copy-from document attribute ID shows a document attribute ID in the electronic document managing server that is the copy-from apparatus for the document and the like. The prefix shows information of a character sequence and a like additionally provided before the attribute value at the copy-from apparatus. When other change conditions are needed, data items are added to maintain information of the change conditions. The copy-to document attribute ID shows the document attribute ID of the copy-to apparatus. <null> shows no value (no entry).

Accordingly, it is shown in the attribute converting table 121 that the attribute identified by the attribute ID "0001" is not reflected to the copy-to apparatus and the attribute identified by the attribute ID "0002" is registered as the attribute identified by the attribute ID "0002" after "ORDER-" is additionally provided before the attribute value in the attributes possessed by a copy-from document (a document to be copied to the copy-to apparatus)

Figure 9:
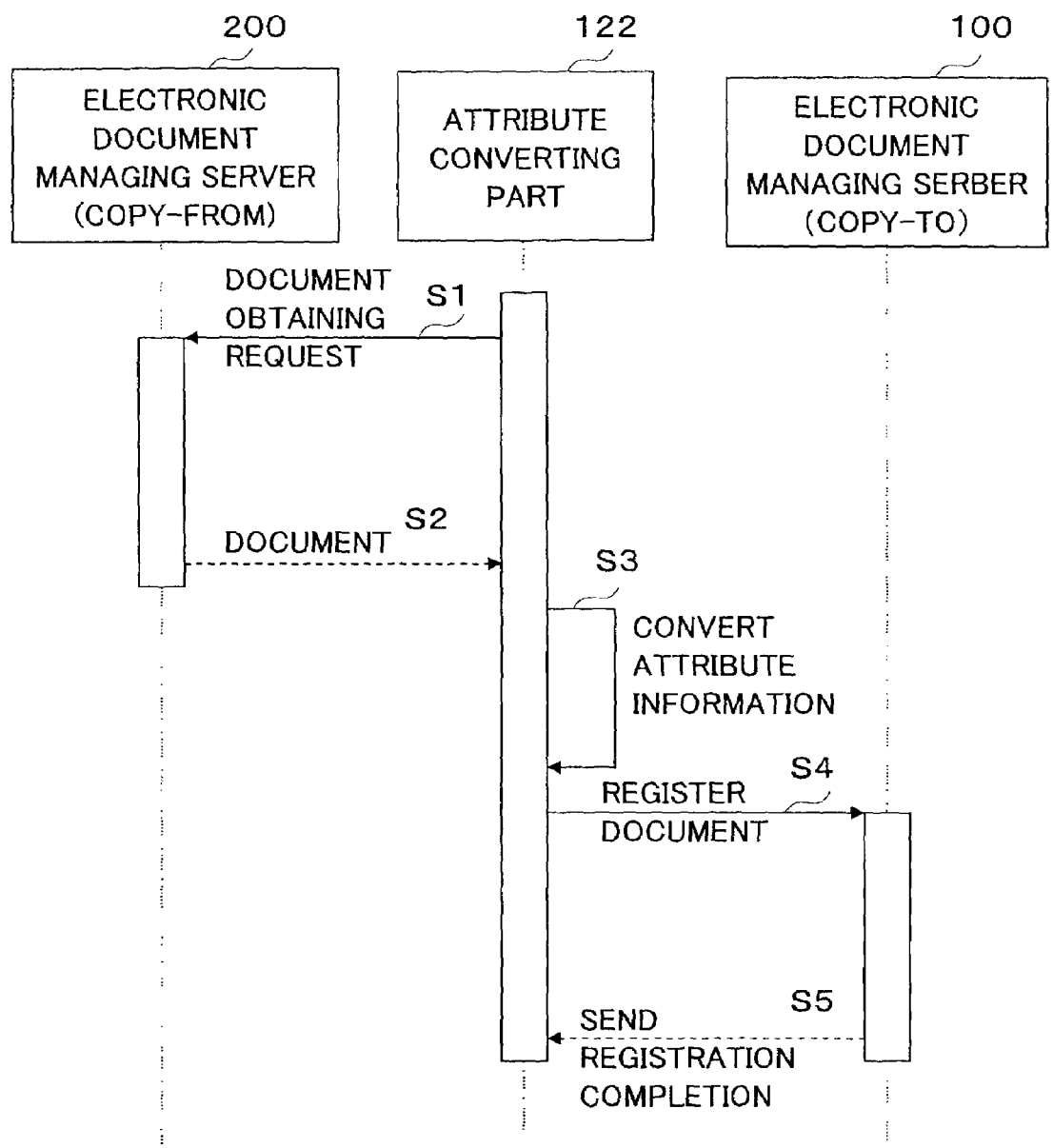
FIG. 9 is a diagram showing a sequence for broadly explaining a process conducted by the electronic document managing system according to the embodiment of the present invention.

Operations of the electronic document managing system 1 will be described. FIG. 9 is a diagram showing a sequence for broadly explaining a process conducted by the electronic document managing system according to the present invention. In FIG. 9, the process in a case of copying the document from the electronic document managing server 200 to the electronic document managing server 100 will be described. That is, the electronic document managing server 200 is the copy-from apparatus and the electronic document managing server 100 is the copy-to apparatus.

In step S1, the attribute converting part 122 of the electronic document managing server 100 sends a request for obtaining the document and the attributes to the electronic document managing server 200. The process goes to step S2 after step S1, the document operating part 214 of the electronic document managing server 200 searches for the document and the-attributes of the document from the document table 211, and sends those to the attribute converting part 122.

In step S3 after step S2, the attribute converting part 122 converts the attributes in accordance with a predetermined rule. And the attribute converting part 122 sends the document operating part 114 a request for registering the document and the attributes converted by the attribute converting part 122 (step S4). The document operating part 114 registers the attributes in the document tables 111 through 113 and sends a completion notice of the registration to the attribute converting part 122 (step S5).

Figure 10:
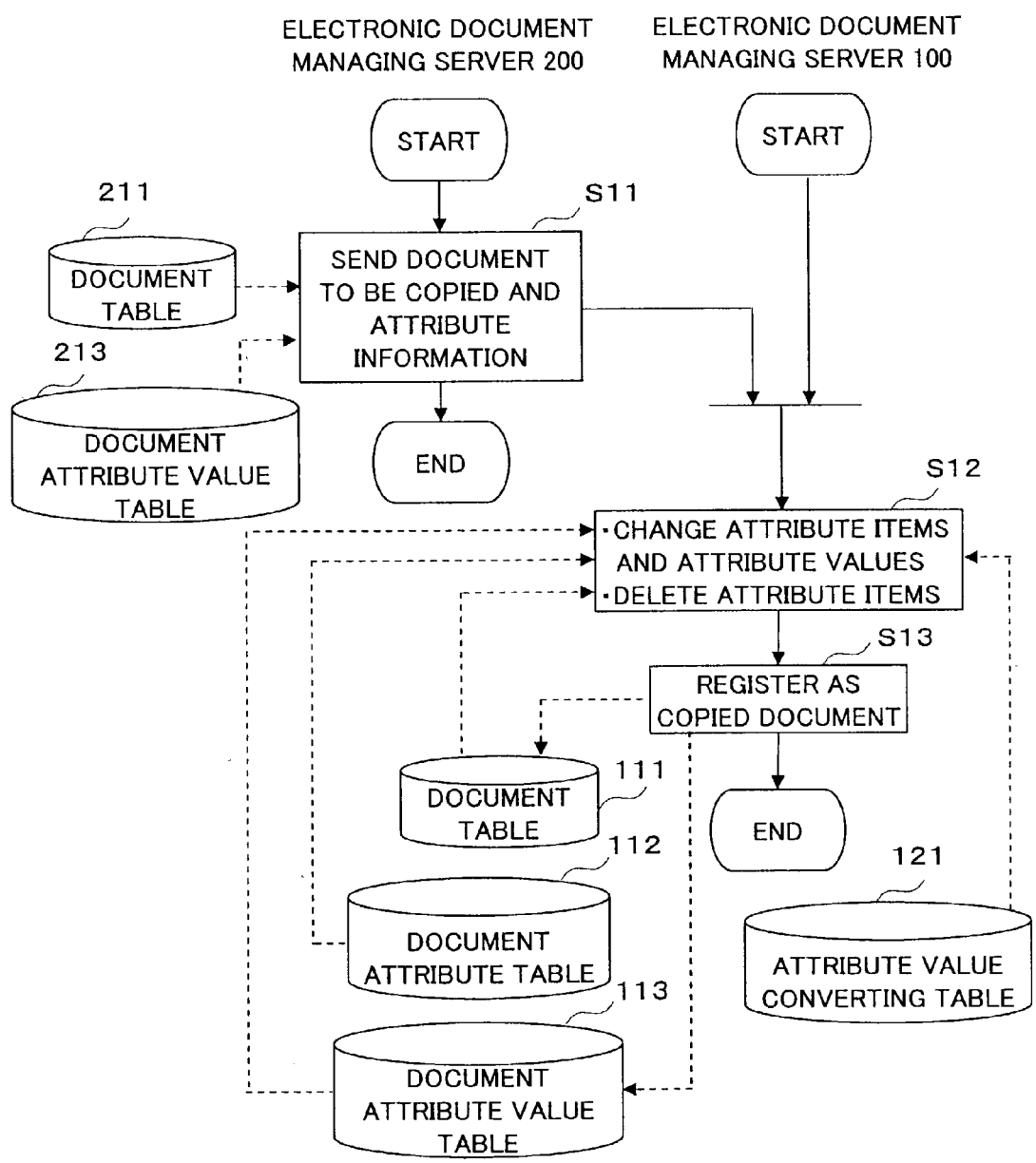
FIG. 10 is a flowchart for explaining a first variation of the electronic document managing system according to the embodiment of the present invention.

Next, the operations of the electronic document managing system will be further described in detail. FIG. 10 is a flowchart for explaining a first variation of the electronic document managing system according to the embodiment of the present invention. In the first variation, similar to the case in FIG. 9, it is assumed that the document is copied from the electronic document managing server 200 to the electronic document managing server 100.

First, the document operation part 214 of the electronic document managing server 200 obtains the document to be copied and the attributes of the document from the document table 211 and the document attribute value table 213 based on a request from the attribute converting part 122 of the electronic document managing server 100, and sends those to the electronic document managing server 100 through the network 400 (step S11).

The attribute converting part 122 of the electronic document managing server 100 obtains the document and the attributes of the document sent from the electronic document managing server 200, and refers to the attribute converting table 121, so as to convert the attributes, that is, so as to change the attribute items and the attribute values, to delete the attribute items, and the like (step S12).

Next, the attribute converting part 122 registers new attributes converted in step S12 to the document attribute value table 113 and registers the document to, be copied to the document table 111 (step S13).

Moreover, on condition of the data structures described in FIG. 5 through FIG. 8, by referring to FIG. 11 and FIG. 12, an operation example in a case of copying the document specified by the document ID "0002" managed in the electronic document managing server 200 to the electronic document managing server 100 will be described. FIG. 11 is a diagram illustrating document data transmitted to the copy-to apparatus. FIG. 12 is a diagram illustrating copied document data. First, in FIG. 11, the electronic document managing server 200 obtains a record related to the document specified by the document ID "0002" from the document table 211 shown in FIG. 5 and the document attribute value table 213 shown in FIG. 7 and sends those to the electronic document managing server 100. In practice, the electronic document managing server 200 obtains the actual data of the document based on the pointer to contents in the storage area in the document table and sends the actual data to the electronic document managing server 100 together with the record.

In this case, the attributes of the document specified by the document ID "0002" are shown as follows:
  document name: PRODUCT A ORDER REQUEST
  document number: 0001
  registration date: Mar. 31, 2001
  company name: RRR
  security level: CONFIDENTIAL The attribute converting part 122 of the electronic document managing server 100 refers to the attribute converting table 121 shown in FIG. 8, and converts the attributes of the document received from the electronic document managing server 200 as follows:
  delete the document name add "ORDER-" at the beginning of the document number to be the document name (document attribute ID: 0002) at the copy-to apparatus retain a value of the registration date but set as the receipt date at the copy-to apparatus do not change the attribute value and the attribute item for the company name delete the security level The originator identified by the document ID "0005" is not included in the attribute items of the document specified by the document ID "0002" at the copy-from apparatus. Accordingly, the originator is not registered for the document at the copy-to apparatus.

As a result of converting the attributes obtained from the document table 211 and the document attribute value table 213 shown in FIG. 5, data maintained in the document table 111 and the document attribute table 113 of the electronic document managing server 100 are shown in FIG. 12. The data are stored as copied document data to the document table 111 and the document attribute table 113 of the electronic document managing server 100. However, in practice, the pointer "addr2" is stored when the actual data sent from the copy-from apparatus is stored, and is reflected in the document table 111.

As a result, the attributes of a copied document are changed as follows:

document number: ORDER-0001
registration date: Mar. 31, 2001
company name: RRR

As described above, in the first variation of the electronic document managing server 100 according to the embodiment of the present invention, since the attribute items of the document of the electronic document managing server 200 as the copy-from apparatus are automatically assigned to different attribute items. Therefore, it is possible to register or display the attributes of the document in a form suitable for requirements at the electronic document managing server 100.

Moreover, the electronic document managing server 100 automatically converts the attribute values of the documents of the copy-from apparatus to different values. Therefore, it is possible to register or display the attributes of the document in the form suitable for the requirements at the electronic document managing server 100.

Furthermore, in the electronic document managing server 100, the attribute items of the document of the copy-from apparatus are not registered to the electronic document managing server 100. Therefore, it is possible for the copy-to apparatus to delete the attribute when it is determined that the attribute does not meet the requirement of the copy-to apparatus.

Figure 13:
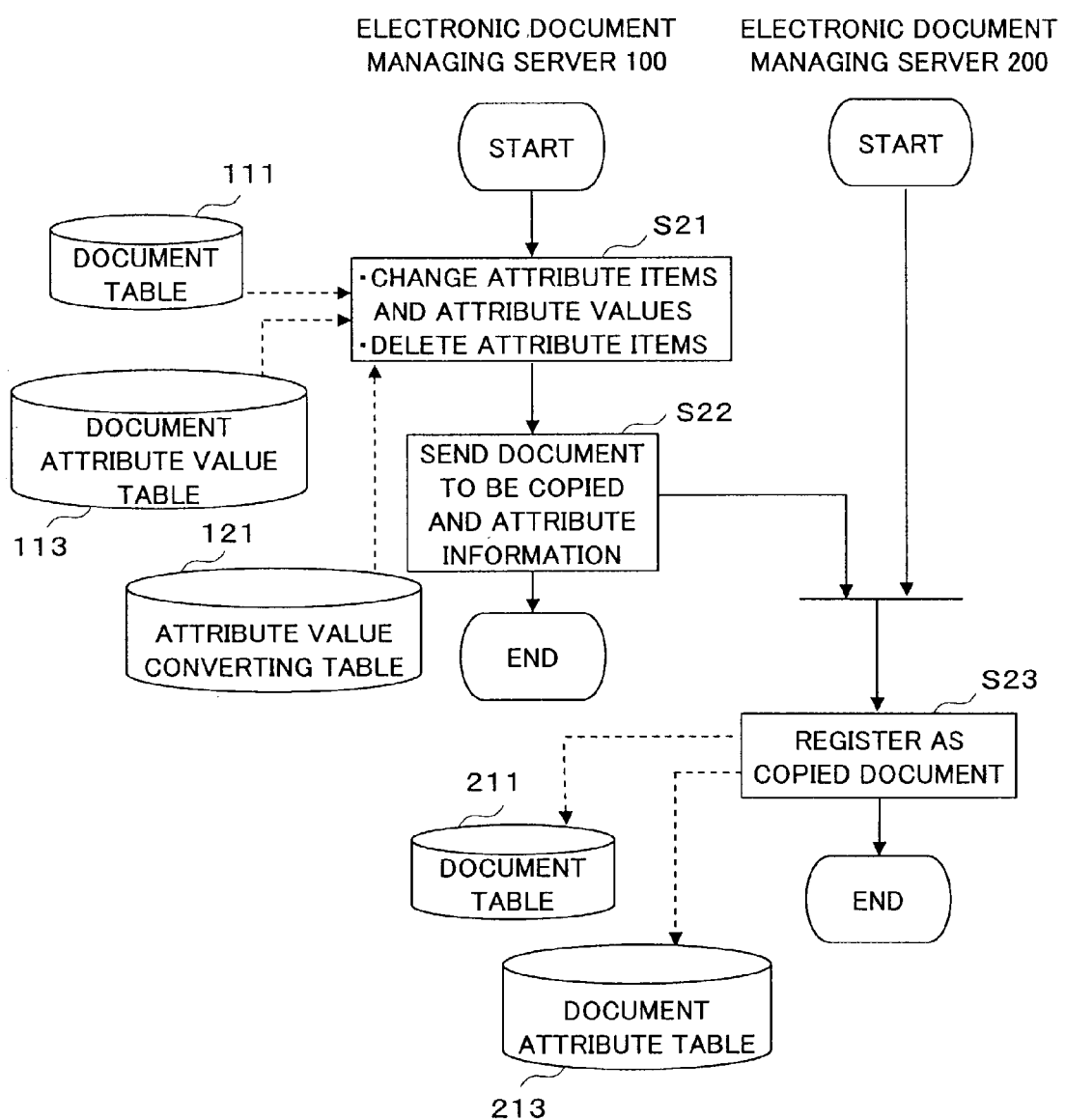
FIG. 13 is a flowchart for explaining a second variation of the electronic document managing system according to the embodiment of the present invention.

As described above, the attributes are converted at the copy-to apparatus. Alternatively, the attributes may be converted at the copy-from apparatus at beforehand, and then converted attributes may be sent to the copy-to apparatus. In a second variation of the electronic document managing system, a process in a case of copying the document from the electronic document managing server 100 to the electronic document managing server 200 will be described. That is, it is assumed that the electronic document managing server 200 is the copy-to apparatus and the electronic document managing server 100 is the copy-from apparatus. FIG. 13 is a flowchart for explaining the second variation of the electronic document managing system according to the embodiment of the present invention.

First, the attribute converting part 122 of the electronic document managing server 100 obtains the document and the attributes of the document from the document table 111 and the document attribute value table 113 through the document operating part 114. The attribute converting part 122 refers to the attribute converting table 121, changes the attribute items and the attribute values, and deletes the attribute items (step S21). Moreover, the attribute converting part 122 sends the converted attributes to the document operating part 214 of the electronic document managing server 200 in order to request a registration (step S22).

Next, the document operating part 214 registers the document and the converted attributes received from the electronic document managing server 100 to the document table 211 and the document attribute value table 213 (step S23) As described above, in the second variation, the electronic document managing server 100 automatically assigns the attribute items of the document to different attribute items and then sends those to the electronic document managing server 200 as the copy-to apparatus. Therefore, the electronic document managing server 200 registers or displays the document attributes in a form suitable for requirements of the electronic document managing server 200.

Moreover, the electronic document managing server 100 automatically-converts the attribute values of the document of the copy-from apparatus to different values and then sends those to the electronic document managing server 200. Therefore, it is possible for the electronic document managing server 200 to register or display the document attribute values in the form suitable for the requirements of the electronic document managing server 200.

Furthermore, the electronic document managing server 100 as the copy-from apparatus does not send a predetermined attribute value of the attribute values of the document. Therefore, the electronic document managing server 200 can suppress registering the attributes that are not suitable for the requirements of the electronic document managing server 200.

Also, if the document copying part 120 is implemented to the electronic document managing server 200 or the terminal 300, the electronic document managing server 200 or the terminal 300 can convert the attributes by the same process as described above.

Figure 14:
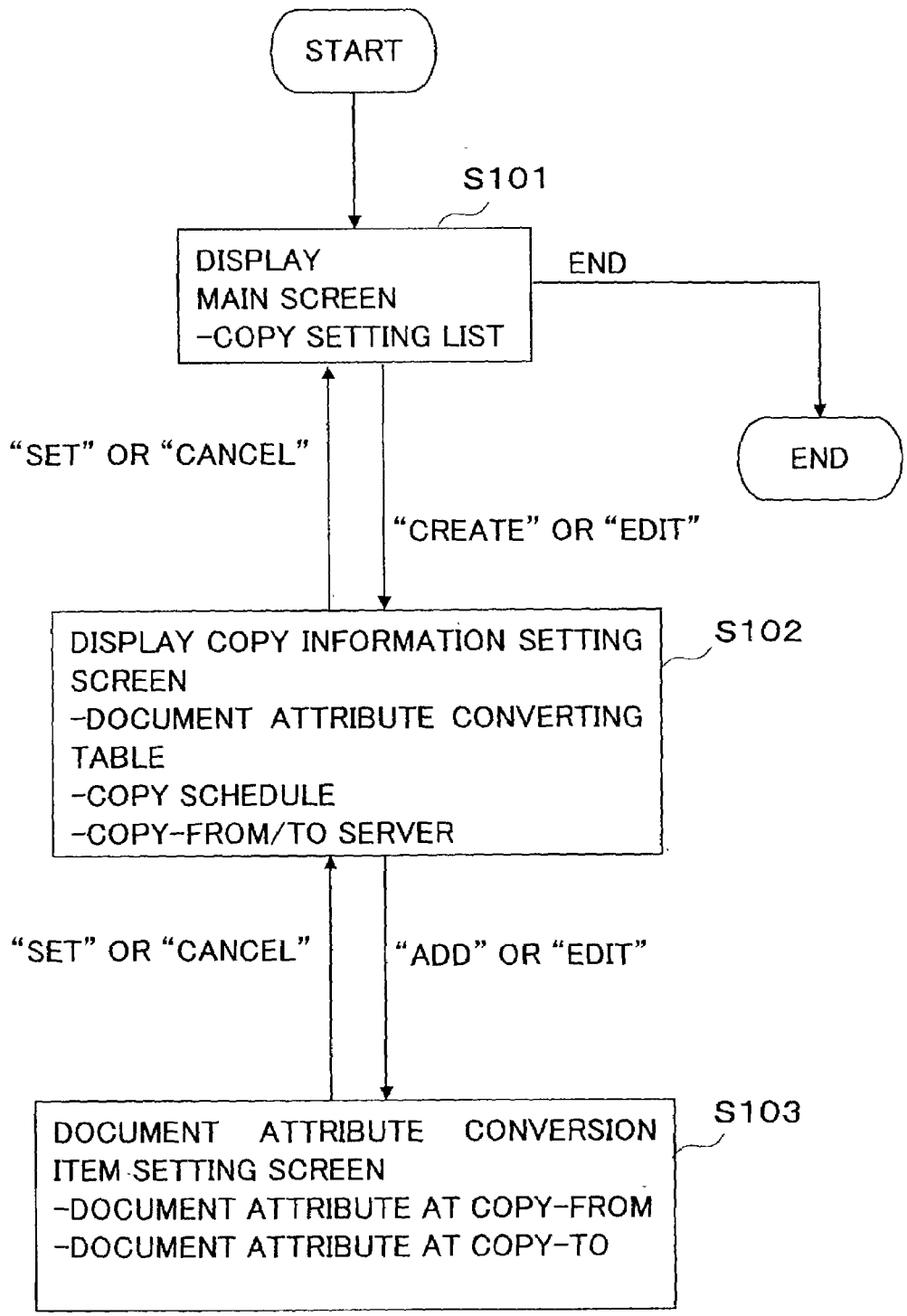
FIG. 14 is a diagram for explaining an operation flow of a copy information setting tool.

Next, a tool for providing a GUI (Graphical User Interface) in that a user sets the conversion rule to the attribute converting table 121 will be described. Hereinafter, the tool is called the copy information setting tool. It should be noted that the copy information setting tool is implemented in the electronic document managing server 100, the electronic document managing server 200, and the terminal 300. FIG. 14 is a diagram for explaining an operation flow of the copy information setting tool.

In step S101, when an instruction for activating the copy information setting tool is issued, the copy information setting tool is displayed at a main screen.

Figure 15:
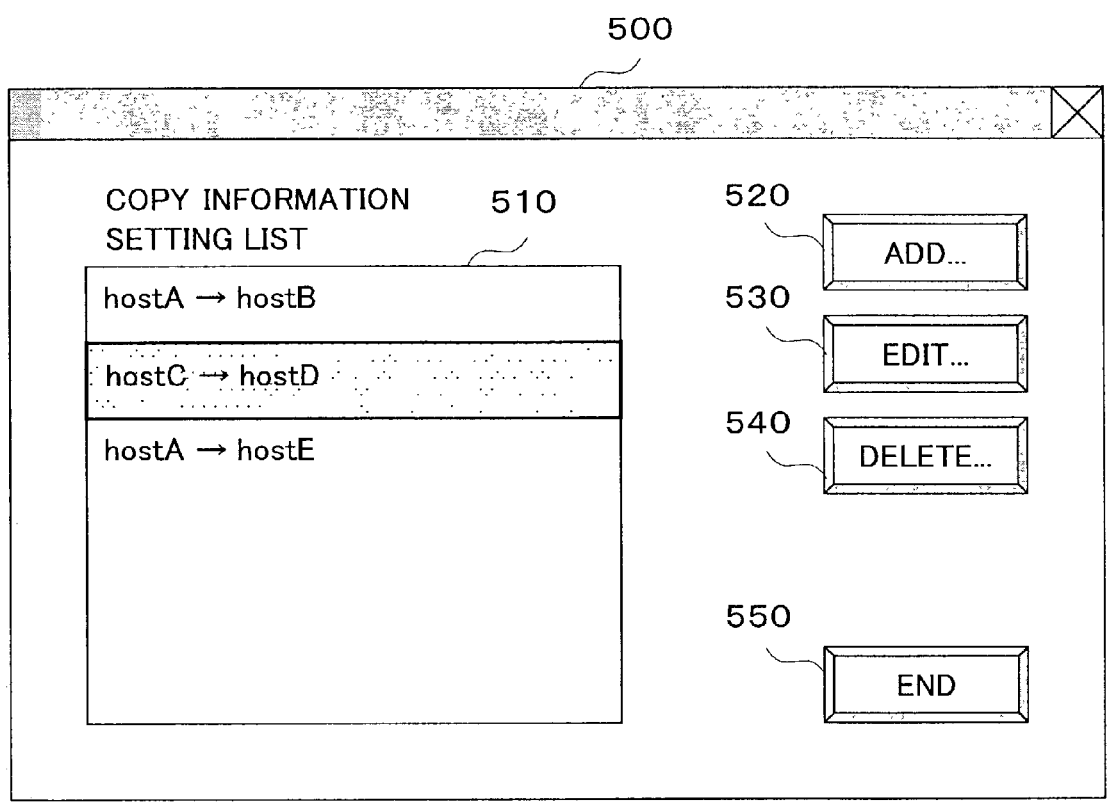
FIG. 15 is a diagram illustrating a main screen of the copy information setting tool.

FIG. 15 is a diagram illustrating the main screen of the copy information setting tool. A main screen 500 shown in FIG. 15 includes a copy information setting list 510, an add button 520, an edit button 530, a delete button 540, and an end button 550. The copy information setting list 510 is a list of setting information that has already been set, and displays machine names of both the copy-from apparatus and the copy-to apparatus for each item of the setting information. When the add button 520 is clicked, the copy information setting screen described later is displayed, and new copy information can be set. When the edit button 530 is clicked, the copy information setting screen for displaying details of the setting information selected from the copy information setting list 510, and then the setting information can be edited. When the delete button 540 is clicked, the setting information selected from the copy information setting list 510 can be deleted. When the end button 550 is clicked, the copy information setting tool is terminated.

The step S102 is conducted when the add button 520 or the edit button 530 is clicked, and the copy information setting tool displays the copy information setting screen.

Figure 16:
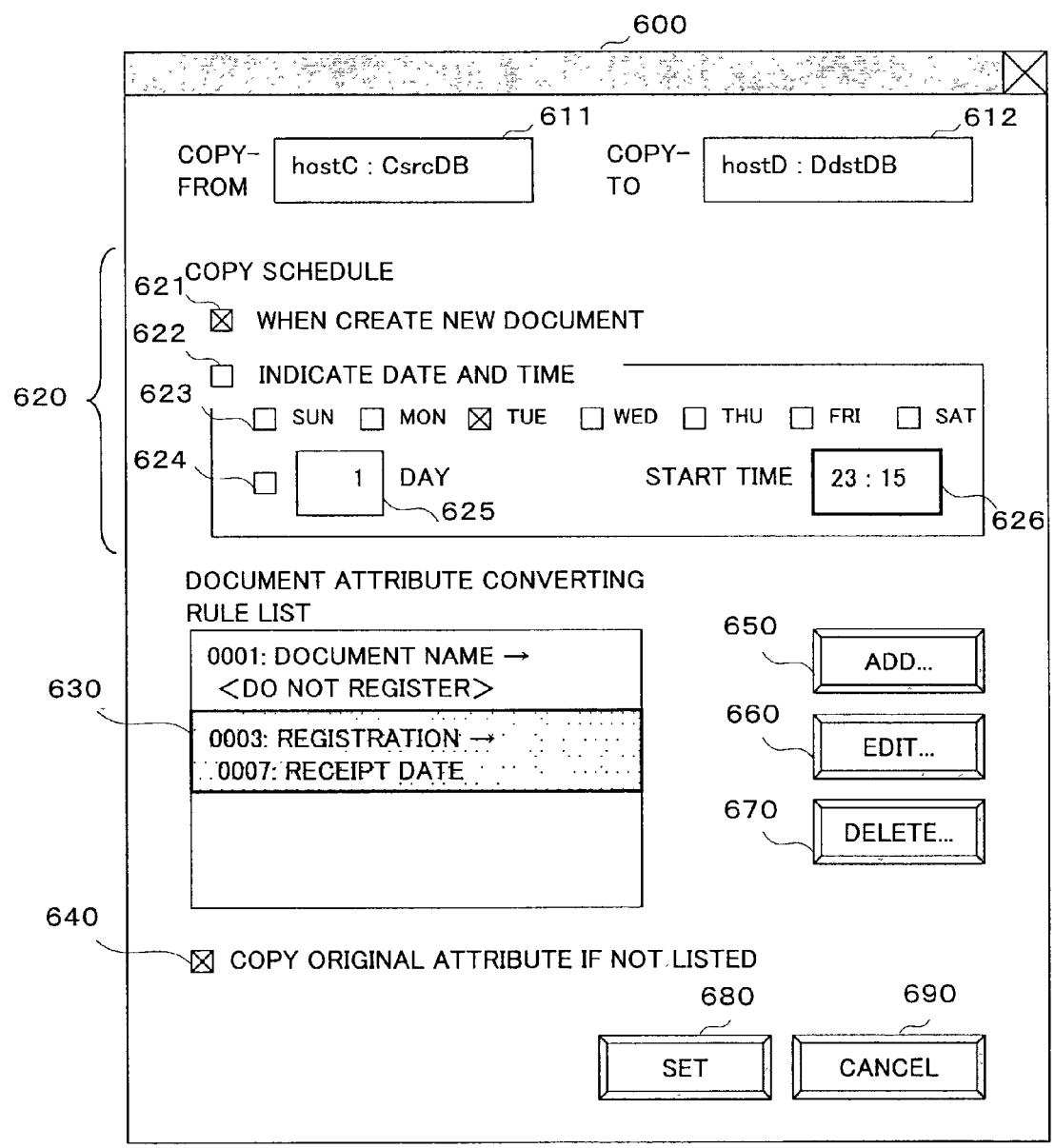
FIG. 16 is a diagram illustrating a copy information setting screen of the copy information setting tool.

FIG. 16 is a diagram illustrating another copy information setting screen of the copy information setting tool. A copy information setting screen 600 shown in FIG. 16 includes a copy-from input area 611, a copy-to input area 612, a copy schedule setting area 620, a document attribute conversion rule list 630, a check button 640, an add button 650, an edit button 660, a delete button 670, a set button 680, a cancel button 690, and a like.

Information for specifying the copy-from apparatus and the copy-to apparatus of the document are input to the copy-from input area 611 and the copy-to input area 612, respectively. In FIG. 16, the copy-from apparatus and the copy-to apparatus are indicated by a form of "machine name: DB name". That is, the machine name and the DB name of the copy-from apparatus is "host C" and "CsrcDB", and the machine name and the DB name of the copy-to apparatus is "host D" and "DsrcDB".

The copy schedule setting area 620 includes a check button 621 for indicating a schedule at a time of a new registration, a check button 622 for indicating date and time, check buttons 623 for indicating a day of a week, a check button 624 for indicating a date, a date input area 625, a start time input area 626, and a like. When the check button 621 for indicating a schedule at a time of a new registration is checked, copying the document is conducted when the document is registered to the copy-from apparatus. When the check button 622 for indicating date and time is checked, the check buttons 623 for indicating a day of a week, the check button 624 for indicating a date, the date input area 625, the start time input area 626, and the like are allowed to be operated. Then, the user can set a day, a date, and time to copy the document.

The document attribute conversion rule list 630 is a list of the conversion rules that have been already set. Referring to the document attribute conversion rule list 630, it is set at a first row that the document name at the copy-from apparatus is not registered to the copy-to apparatus. And it is set at a second row that the registration date at the copy-from apparatus is registered as the receipt date at the copy-to apparatus. When the check button 640 is checked, the attributes that are not displayed in the document attribute conversion rule list 630 are copied from the copy-from apparatus to the copy-to apparatus without any conversion. Accordingly, when the check button 640 is not checked, only the attributes displayed in the document attribute conversion rule list 630 are copied.

When the add button 650 is clicked, a document attribute conversion rule setting screen (described later) is displayed, and a new conversion rule can be set. When the edit button 660 is clicked, the document attribute conversion rule setting screen is displayed to show details of the conversion rule selected from the document attribute conversion rule list 630, and then the conversion rule can be edited. When the delete button 670 is clicked, the conversion rule selected from the document attribute conversion rule list 630 can be deleted. When the set button 680 is clicked, the copy information setting screen 600 is closed and also the setting information is updated in the copy information setting list 510 of the main screen 500. When the cancel button 690 is clicked, information set at the copy information setting screen 600 are canceled, and then the copy information setting screen 600 is closed. When the set button 680 or the cancel button 690 is clicked, the process goes back to the step S10 and the operation is conducted at the main screen 500.

When the add button 650 or the edit button 660 is clicked, the process goes to step S103, and the copy information setting tool displays the document attribute conversion rule setting screen.

Figure 17:
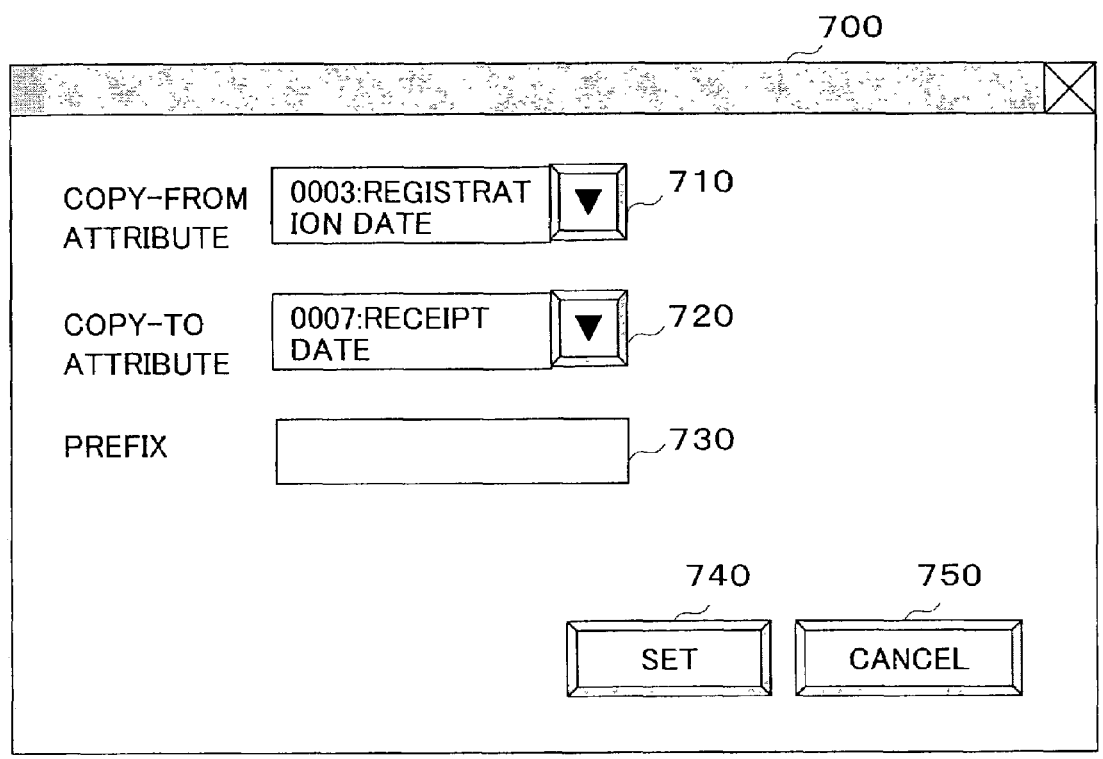
FIG. 17 is a diagram illustrating the document attribute conversion rule setting screen of the copy information setting tool.

FIG. 17 is a diagram illustrating the document attribute conversion rule setting screen of the copy information setting tool. The document attribute conversion rule setting screen 700 shown in FIG. 17 includes a combo box 710 for selecting the attributes of the copy-from apparatus, a combo box 720 for selecting the attributes of the copy-to apparatus, a prefix input area 730, a set button 740, a cancel button 750, and a like.

The combo box 710 for selecting the attributes of the copy-from apparatus is a combo box to select the attributes of the document of the copy-from apparatus to be converted. That is, the document attribute ID of the attribute selected by the combo box 710 is registered to the copy-from document attribute ID of the attribute converting table 121. The combo box 720 for selecting the attribute of the copy-to apparatus is a combo box to select the attribute of the copy-to apparatus to register the attribute indicated by the combo box 710 for selecting the attribute of the copy-from apparatus. That is, the document attribute ID of the attribute selected by the combo box 720 for selecting the attribute of the copy-to apparatus is registered to the copy-to document attribute ID of the attribute converting table 121.

In addition to the attributes available at the copy-to apparatus, "do not register" and "add . . . " can be selected from the combo box 720 for selecting the attribute of the copy-to apparatus. When "do not register" is selected, the attribute indicated by the combo box 710 for selecting the attribute of the copy-from apparatus will not be registered at the copy-to apparatus. That is, in the attribute converting table 121, the copy-to document attribute ID is shown as <null>. When "add . . . " is selected, a new attribute creating screen (not shown) is displayed, and the new attribute created at the new attribute creating screen can be indicated as the attribute of the copy-to apparatus.

The prefix input area 730 is an area for inputting a prefix to convert the attribute. That is, a value input in the prefix input area 730 is registered to the prefix of the attribute converting table 121.

When the set button 740 is clicked, the document attribute conversion rule setting screen 700 is closed. Then, the conversion rule set at the document attribute conversion rule setting screen 700 is reflected to the attribute converting table 121, and also a conversion detail is displayed in the document attribute conversion rule list 630 of the copy information setting screen 600. When the cancel button 690 is clicked, the conversion rule set at the document attribute conversion rule setting screen 700 is canceled, and then the document attribute conversion rule setting screen 700 is closed. When the set button 740 or the cancel button 750 is clicked, the process goes back to the step S102, and then the operation is conducted at the copy information setting screen 600.

After copy information is set in accordance with the process above-described and the copy information setting tool is terminated, the copy information setting tool activates the attribute converting part 122 when a time set in the copy schedule setting area 620 in the copy information setting screen 600 comes. Alternatively, a function for managing a schedule is implemented to the attribute converting part 122, the copy information setting tool sets the copy information to the attribute converting part 122 when the copy information is set at screens provided by the copy information setting tool. In this case, the attribute converting part 122 detects the time, which is scheduled, and starts copying the document.

By using the copy information setting tool according to the embodiment of the present invention, it is possible for a user to set the copy information of the document by a simple operation. Also, it is possible to automatically copy the document at a time that is scheduled.

As described above, according to the present invention, when the attributes of electronic data are copied from the copy-from apparatus to the copy-to apparatus, it is possible to register the attributes of the electronic data to the copy-to apparatus in a form suitable for requirements of the copy-to apparatus.

The present invention is not limited to the specifically disclosed embodiments, and variations and modifications may be made without departing from the scope of the present invention.

The present application is based on the Japanese priority applications No.2001-382240 filed on Dec. 14, 2001 and No.2002-341223 filed on Nov. 25, 2002, the entire contents of which are hereby incorporated by reference.

What is claimed is:

1. An apparatus for managing electronic data as a copy-to apparatus receiving the electronic data to copy, comprising:
   an electronic data managing part managing electronic data and attribute items of the electronic data by using an electronic data table in which the attribute items are associated with the electronic data;
   an electronic data attribute value managing part managing the attribute items and attribute values by using an electronic data attribute value table in which the attribute values correspond to respective attribute items for the electronic data;
   an attribute conversion managing part managing the attribute items and respective data formats for the electronic data in a correspondence to received attribute items by using an attribute conversion table;
   an assigning part assigning the received attribute values of the electronic data from a copy-from apparatus to the attribute items in the respective data forms by referring to the attribute conversion table; and
   a registering part registering the electronic data and the attribute items to the electronic data managing part, and registering the attribute values corresponding to the attribute items to the electronic data attribute value managing part.

2. The apparatus as claimed in claim 1, further comprising:
   a value converting part converting of the received attribute values from said copy-from apparatus to different attribute values in accordance with the respective data format.

3. The apparatus as claimed in claim 1, further comprising a registration suppressing part suppressing said registering part from registering predetermined received attribute values of from said copy-from apparatus.

4. A method for managing electronic data in a copy-to apparatus receiving the electronic data to copy, comprising the steps of:

(a) managing electronic data and attribute items of the electronic data by using an electronic data table in which the attribute items are associated with the electronic data;
(b) managing the attribute items and attribute values by using an electronic data attribute value table in which the attribute values correspond to respective attribute items for the electronic data;
(c) managing the attribute items and respective data formats for the electronic data in a correspondence to received attribute items by using an attribute conversion table;
(d) assigning of the received attribute values of the electronic data from a copy-from apparatus to the attribute items in the respective data forms by referring to the attribute conversion table; and
(e) registering the electronic data and the attribute items to the electronic data table, and registering the attribute values corresponding to the attribute items to the electronic data attribute value table.

5. The method as claimed in claim 4, further comprising the step of:
   converting the received attribute values received from said copy-from apparatus to different attribute values from the predetermined attribute values in accordance with the respective data format.

6. The method as claimed in claim 4, further comprising the step of suppressing said step (e) from registering received predetermined attribute values from said copy-from apparatus.

7. A program product embodied on a computer-readable medium for causing a computer to manage electronic data in a copy-to apparatus receiving the electronic data to copy, comprising:
   first code for managing electronic data and attribute items of the electronic data by using an electronic data table in which the attribute items are associated with the electronic data;
   second code for managing the attribute items and attribute values by using an electronic data attribute value table in which the attribute values correspond to respective attribute items for the electronic data;
   third code for managing the attribute items and respective data formats for the electronic data in a correspondence to received attribute items by using an attribute conversion table;
   fourth code for assigning of the received attribute values of the electronic data from a copy-from apparatus to the attribute items in the respective data forms by referring to the attribute conversion table; and
   fifth code for registering the electronic data and the attribute items to the electronic data table, and registering the attribute values corresponding to the attribute items to the electronic data attribute value table.

8. A computer-readable recording medium recorded with program code for causing a computer to manage electronic data in a copy-to apparatus receiving the electronic data to copy, comprising:
   first code for managing electronic data and attribute items of the electronic data by using an electronic data table in which the attribute items are associated with the electronic data;
   second code for managing the attribute items and attribute values by using an electronic data attribute value table in which the attribute values correspond to respective attribute items for the electronic data;

third code for managing the attribute items and respective data formats for the electronic data in a correspondence to received attribute items by using an attribute conversion table;

fourth code for assigning predetermined attribute values of the received attribute values of the electronic data from a copy-from apparatus to the attribute items in the respective data forms by referring to the attribute conversion table; and fifth code for registering the electronic data and the attribute items to the electronic data table, and registering the attribute values corresponding to the attribute items to the electronic data attribute value table.

9. An apparatus for managing electronic data as a copy-from apparatus sending the electronic data to copy, comprising:

an electronic data managing part managing electronic data and attribute items of the electronic data by using an electronic data table in which the attribute items are associated with the electronic data;

an electronic data attribute value managing part managing the attribute items and attribute values by using an electronic data attribute value table in which the attribute values correspond to respective attribute items for the electronic data;

an attribute conversion managing part managing subject attribute items to be transmitted and respective data formats for the electronic data in a correspondence to the attribute items by using an attribute conversion table;

an assigning part assigning the attribute values of the electronic data, the subject attribute items to be transmitted to a copy-to apparatus in the respective data forms by referring to the attribute conversion table; and a transmitting part transmitting the electronic data, the subject attribute items, and the attribute values assigned to the subject items in the respective data forms to said copy-to apparatus.

10. The apparatus as claimed in claim 9, further comprising:

a value converting part converting the attribute values, which are to be transmitted to said copy-to apparatus and assigned to the subject attribute items, to different attribute values in accordance with the respective data format.

11. The apparatus as claimed in claim 9, further comprising a transmission suppressing part suppressing said transmitting part from transmitting predetermined attribute values assigned to the subject attribute items to said copy-to apparatus.

12. A method for managing electronic data in a copy-from apparatus transmitting the electronic data to copy, comprising the steps of:

(a) managing electronic data and attribute items of the electronic data by using an electronic data table in which the attribute items are associated with the electronic data;

(b) managing the attribute items and attribute values by using an electronic data attribute value table in which the attribute values correspond to respective attribute items for the electronic data;

(c) managing subject attribute items to be transmitted and respective data formats for the electronic data in a correspondence to the attribute items by using an attribute conversion table;

(d) assigning the attribute values of the electronic data, to the subject attribute items to be transmitted to a copy-to apparatus in the respective data forms by referring to the attribute conversion table; and (e) transmitting the electronic data, the subject attribute items, and the attribute values assigned to the subject items in the respective data form to said copy-to apparatus.

13. The method as claimed in claim 12, further comprising the step of:

converting the attribute values, which are to be transmitted to said copy-to apparatus and assigned to the subject attribute items, to different attribute values in accordance with the respective data format.

14. The method as claimed in claim 12, further comprising the step of suppressing said step (e) from transmitting predetermined attribute values assigned to the subject attribute items to said copy-to apparatus.

15. A program product embodied on a computer-readable medium for causing a computer to manage electronic data in a copy-from apparatus transmitting the electronic data to copy, comprising:

first code for managing electronic data and attribute items of the electronic data by using an electronic data table in which the attribute items are associated with the electronic data;

second code for managing the attribute items and attribute values by using an electronic data attribute value table in which the attribute values correspond to respective attribute items for the electronic data;

third code for managing subject attribute items to be transmitted and respective data formats for the electronic data in a correspondence to the attribute items by using an attribute conversion table;

fourth code for assigning of the attribute values of the electronic data, to the subject attribute items to be transmitted to a copy-to apparatus in the respective data forms by referring to the attribute conversion table; and fifth code for transmitting the electronic data, the subject attribute items. and the attribute values assigned to the subject items in the respective data forms to said copy-to apparatus.

16. A computer-readable recording medium recorded with program code for causing a computer to manage electronic data in a copy-from apparatus transmitting the electronic data to copy, comprising:

first code for managing electronic data and attribute items of the electronic data by using an electronic data table in which the attribute items are associated with the electronic data;

second code for managing the attribute items and attribute values by using an electronic data attribute value table in which the attribute values correspond to respective attribute items for the electronic data;

third code for managing subject attribute items to be transmitted and respective data formats for the electronic data in a correspondence to the attribute items by using an attribute conversion table;

fourth code for assigning of the attribute values of the electronic data, to the subject attribute items to be transmitted to a copy-to apparatus in the respective data forms by referring to the attribute conversion table; and fifth code for transmitting the electronic data, the subject attribute items. and the attribute values assigned to the subject items in the respective data forms to said copy-to apparatus.

17. A system for copying electronic data from a copy-from apparatus to a copy-to apparatus, said copy-from apparatus managing and transmitting the electronic data to said copy-to apparatus, said copy-to apparatus receiving the electronic data from said copy-from apparatus and managing the electronic data, said system comprising:

an electronic data managing part managing the electronic data and copy-to attribute items of the electronic data by using an electronic data table in which the copy-to attribute items are associated with the electronic data;

an electronic data attribute value managing part managing the copy-to attribute items and copy-to attribute values by using an electronic data attribute value table in which the copy-to attribute values correspond to respective copy-to attribute items for the electronic data;

an attribute conversion managing part managing the copy-to attribute items and respective data formats for the electronic data in a correspondence to copy-from attribute items by using an attribute conversion table;

an assigning part assigning the copy-from attribute values of the electronic data to the copy-to attribute items in the respective data forms by referring to the attribute conversion table; and a registering part registering the electronic data and the copy-to attribute items to the electronic data managing part, and registering the copy-to attribute values corresponding to the copy-to attribute items to the electronic data attribute value managing.

18. A system for copying electronic data, comprising:

a copy-from apparatus managing and transmitting the electronic data to copy; and a copy-to apparatus including an electronic data managing part for managing the electronic data and receiving the electronic data from said copy-from apparatus and managing the electronic data, whereby the electronic data are copied from said copy-from apparatus to said copy-to apparatus, wherein:

said copy-to apparatus comprises: an electronic data managing part managing electronic data and attribute items of the electronic data by using an electronic data table in which the attribute items are associated with the electronic data;

an electronic data attribute value managing part managing the attribute items and attribute values by using an electronic data attribute value table in which the attribute values correspond to respective attribute items for the electronic data;

an attribute conversion managing part managing the attribute items and respective data formats for the electronic data in a correspondence to received attribute items by using an attribute conversion table an assigning part assigning of the received attribute values of the electronic data, which are received from said copy-from apparatus, to the attribute items in the respective data forms by referring to the attribute conversion table; and a registering part registering the electronic data and the attribute items to the electronic data managing part, and registering the attribute values corresponding to the attribute items to the electronic data attribute value managing part.

19. A system for copying electronic data, comprising:

a copy-from apparatus managing and transmitting the electronic data to copy; and a copy-to apparatus including an electronic data managing part for managing the electronic data and receiving the electronic data from said copy-from apparatus and managing the electronic data, whereby the electronic data are copied from said copy-from apparatus to said copy-to apparatus, wherein:

said copy-from apparatus comprises:

an electronic data managing part managing electronic data and attribute items of the electronic data by using an electronic data table in which the attribute items are associated with the electronic data;

an electronic data attribute value managing part managing the attribute items and attribute values by using an electronic data attribute value table in which the attribute values correspond to respective attribute items for the electronic data;

an attribute conversion managing part managing subject attribute items to be transmitted and respective data formats for the electronic data in a correspondence to the attribute items by using an attribute conversion table;

an assigning part assigning the attribute values of the electronic data, to the subject attribute items to be transmitted to a copy-to apparatus in the respective data forms by referring to the attribute conversion table; and a transmitting part transmitting the electronic data, the subject attribute items, and the attribute values assigned to the subject items in the respective data forms to said copy-to apparatus.

* * * * *